US012637191B1

(12) United States Patent
VanSomeren et al.

(10) Patent No.: US 12,637,191 B1
(45) Date of Patent: May 26, 2026

(54) SYSTEM AND METHOD FOR VARYING BOAT SPEED TO INCREASE FISH CATCH RATE

(71) Applicant: Brunswick Corporation, Mettawa, IL (US)

(72) Inventors: Caleb J. VanSomeren, Oakfield, WI (US); Timothy P. Sherry, Warkworth (NZ); Christopher D. Crawford, Bixby, OK (US)

(73) Assignee: Brunswick Corporation, Mettawa, IL (US)

( * ) Notice: Subject to any disclaimer, the term of this patent is extended or adjusted under 35 U.S.C. 154(b) by 179 days.

(21) Appl. No.: 18/537,961

(22) Filed: Dec. 13, 2023

(51) Int. Cl.
*B63H 21/21* (2006.01)
*A01K 97/00* (2006.01)

(52) U.S. Cl.
CPC ............. *B63H 21/21* (2013.01); *A01K 97/00* (2013.01); *B63H 2021/216* (2013.01)

(58) Field of Classification Search
CPC ... B63H 21/21; B63H 2021/216; A01K 97/00
See application file for complete search history.

(56) References Cited

U.S. PATENT DOCUMENTS

| | | | |
|---|---|---|---|
| 6,273,771 B1 | 8/2001 | Buckley et al. | |
| 7,267,068 B2 | 9/2007 | Bradley | |
| 9,039,468 B1 | 5/2015 | Arbuckle | |
| 9,594,374 B2 | 3/2017 | Langford-Wood | |
| 9,594,375 B2 | 3/2017 | Jopling | |
| 9,952,595 B2 | 4/2018 | Arbuckle | |
| 9,988,134 B1 | 6/2018 | Gable | |
| 10,025,312 B2 | 7/2018 | Langford-Wood | |
| 10,562,602 B1 | 2/2020 | Gable | |
| 10,913,524 B1 | 2/2021 | Wald | |
| 11,403,955 B2 | 8/2022 | Derginer | |
| 11,480,966 B2 | 10/2022 | Malouf | |
| 11,731,749 B1 * | 8/2023 | Moran ................... | B63H 21/21 |
| | | | 440/1 |
| 12,065,230 B1 | 8/2024 | Derginer | |
| 12,134,454 B1 | 11/2024 | Derginer | |
| 2017/0253314 A1 | 9/2017 | Ward | |

(Continued)

OTHER PUBLICATIONS

ITroll: We Never, Ever Compromise. (Same as that reported on Dec. 13, 2023 IDS) Innova Design & Distributing, Inc. webpage, available at www.itroll/us/z.itroll.hunt.html.downloaded Jul. 15, 2023 (Year: 2023).*

(Continued)

*Primary Examiner* — Kito R Robinson
*Assistant Examiner* — Tanya C Sienko
(74) *Attorney, Agent, or Firm* — Andrus Intellectual Property Law, LLP

(57) ABSTRACT

A marine propulsion system comprises an electric marine drive having an electric motor in torque-transmitting relationship with a propulsor, a controller configured to vary a speed of the electric motor, and a feedback device configured to provide an input to the controller. The controller is configured to vary the speed of the electric motor according to a set of operating parameters so as to periodically vary a speed of the propulsor. The controller is configured to update the set of operating parameters in response to receiving the input from the feedback device.

20 Claims, 4 Drawing Sheets

(56)                    References Cited

U.S. PATENT DOCUMENTS

| | | | |
|---|---|---|---|
| 2018/0295829 A1* | 10/2018 | Blackadar | G06N 5/04 |
| 2019/0256178 A1* | 8/2019 | Grace | G06F 3/14 |
| 2021/0294329 A1* | 9/2021 | Afman | G08G 3/00 |
| 2022/0234702 A1* | 7/2022 | Maddox | B63B 34/10 |
| 2023/0021635 A1* | 1/2023 | Gallagher | B63H 20/02 |
| 2023/0339582 A1* | 10/2023 | Moromi | B63B 79/40 |
| 2024/0025528 A1 | 1/2024 | Derginer | |
| 2024/0246652 A1* | 7/2024 | Tuuliainen | B63H 25/02 |

OTHER PUBLICATIONS

Wikipedia entry: Reinforcement learning Feb. 6, 2022 on Wayback Machine (Year: 2022).*

Innova Design & Distributing, Inc., iTroll Precision Throttle Controller, Generation 2 Owner's Manual, admitted prior art.

Innova Design & Distributing, Inc., "iTroll: We Never, Ever Compromise," webpage, available at www.itroll.us/z.itroll.hunt.html, accessed Jul. 15, 2023.

Innova Design & Distributing, Inc., "iTroll: 2013-2023 We Never, Ever Compromise," webpage, available at www.itroll.us, accessed Jul. 15, 2023.

Vansomeren et al., "Trolling Motor and Kicker Motor Mode Control," U.S. Appl. No. 18/539,659, filed Dec. 14, 2023 (drawings, specification, and claims only).

Laster, Matthew, "Systems and Methods for Controlling a Watercraft via Propulsion Devices," U.S. Appl. No. 18/636,811, filed Apr. 16, 2024 (drawings, specification, and claims only).

Vansomeren et al., "System and Method for Varying Boat Speed to Increase Fish Catch Rate," U.S. Appl. No. 18/537,961, filed Dec. 13, 2023 (drawings, specification, and claims only).

Karnick, Kyle, "Precision Vessel Control Utilizing Combinations of Propulsion Devices," U.S. Appl. No. 18/406,452, filed Jan. 8, 2024 (drawings, specification, and claims only).

\* cited by examiner

SYSTEM AND METHOD FOR VARYING BOAT SPEED TO INCREASE FISH CATCH RATE

FIELD

The present disclosure relates to boats equipped with motorized marine drives and to systems and methods for operating a marine drive.

BACKGROUND

Anglers will often vary boat speed when fishing in order to increase their fish catch rate. It is believed that speed changes make the bait seem more realistic to a fish, increasing the likelihood the fish will bite. Typically, the angler increases and decreases boat speed manually, such as by manipulating a throttle lever or switch (e.g., for an internal combustion engine powered marine drive) or by manipulating a motor speed switch or button (e.g., for an electric trolling motor).

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a marine propulsion system comprises an electric marine drive having an electric motor in torque-transmitting relationship with a propulsor, a controller configured to vary a speed of the electric motor, and a feedback device configured to provide an input to the controller. The controller is configured to vary the speed of the electric motor according to a set of operating parameters so as to periodically vary a speed of the propulsor. The controller is configured to update the set of operating parameters in response to receiving the input from the feedback device.

According to some aspects, the controller is configured to process the input from the feedback device using a machine learning algorithm so as to update the set of operating parameters.

According to some aspects, the controller is configured to process at least one of the following additional inputs using the machine learning algorithm so as to update the set of operating parameters: the speed of the propulsor; a temperature of water in which the marine drive is operating; a depth of water in which the marine drive is operating; a reading from a sonar coupled to a boat on which the marine drive is installed; a geographical position of the boat; a current speed of the boat; a current heading of the boat; a historic speed of the boat when the input from the feedback device was previously received; and a historic heading of the boat when the input from the feedback device was previously received.

According to some aspects, the machine learning algorithm is a reinforcement learning algorithm.

According to some aspects, the set of operating parameters comprises a maximum speed of the electric motor and a minimum speed of the electric motor.

According to some aspects, the set of operating parameters comprises an increment or decrement value by which the speed of the electric motor is to be varied.

According to some aspects, the set of operating parameters comprises a length of time for which the electric motor is to be operated at a given speed.

According to some aspects, the feedback device is a key configured to be manipulated by an operator.

According to some aspects, the feedback device is a speed sensor configured to determine the speed of the propulsor or a speed of a boat on which the marine drive is installed.

According to some aspects, the feedback device is an optical instrument or a microphone.

According to another example of the present disclosure, a method of varying a speed of a propulsor on a marine drive comprises: operating the marine drive with a controller according to a set of operating parameters so as to periodically vary a speed of the propulsor; receiving an input to the controller from one or more feedback devices; processing the input from the one or more feedback devices with a machine learning algorithm; and operating the marine drive according to an updated set of operating parameters determined by the machine learning algorithm so as to periodically vary the speed of the propulsor.

According to some aspects, the set of operating parameters comprises at least one of the following: a maximum speed of a prime mover in torque-transmitting relationship with the propulsor; a minimum speed of the prime mover; an increment or decrement value by which the speed of the prime mover is to be varied so as to vary the speed of the propulsor; and a length of time for which the prime mover is to be operated at a given speed.

According to some aspects, the one or more feedback devices comprises at least one of the following: a key configured to be manipulated by an operator; a speed sensor configured to determine the speed of the propulsor or a speed of a boat on which the marine drive is installed; an optical instrument; and a microphone.

According to some aspects, the machine learning algorithm is a reinforcement learning algorithm.

According to another example of the present disclosure, a marine propulsion system comprises a marine drive having a propulsor configured to provide thrust, a controller configured to vary a speed of the propulsor, and one or more feedback devices configured to provide an input to the controller. The controller is configured to periodically vary the speed of the propulsor according to a set of operating parameters comprising a speed increment or decrement value and a dwell time. The controller is configured to update the set of operating parameters in response to receiving the input from the one or more feedback devices.

According to some aspects, the controller is configured to process the input from the one or more feedback devices using a machine learning algorithm so as to update the set of operating parameters.

According to some aspects, the controller is configured to process at least one of the following additional inputs using the machine learning algorithm so as to update the set of operating parameters: the speed of the propulsor; a temperature of water in which the marine drive is operating; a depth of water in which the marine drive is operating; a reading from a sonar coupled to a boat on which the marine drive is installed; a geographical position of the boat; a current speed of the boat; a current heading of the boat; a historic speed of the boat when the input from the one or more feedback devices was previously received; and a historic heading of the boat when the input from the one or more feedback devices was previously received.

According to some aspects, the machine learning algorithm is a reinforcement learning algorithm.

According to some aspects, the set of operating parameters further comprises at least one of the following: a maximum speed of the propulsor and a minimum speed of the propulsor.

According to some aspects, the one or more feedback devices comprises at least one of the following: a key configured to be manipulated by an operator; a speed sensor configured to determine the speed of the propulsor or a speed of a boat on which the marine drive is installed; an optical instrument; and a microphone.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
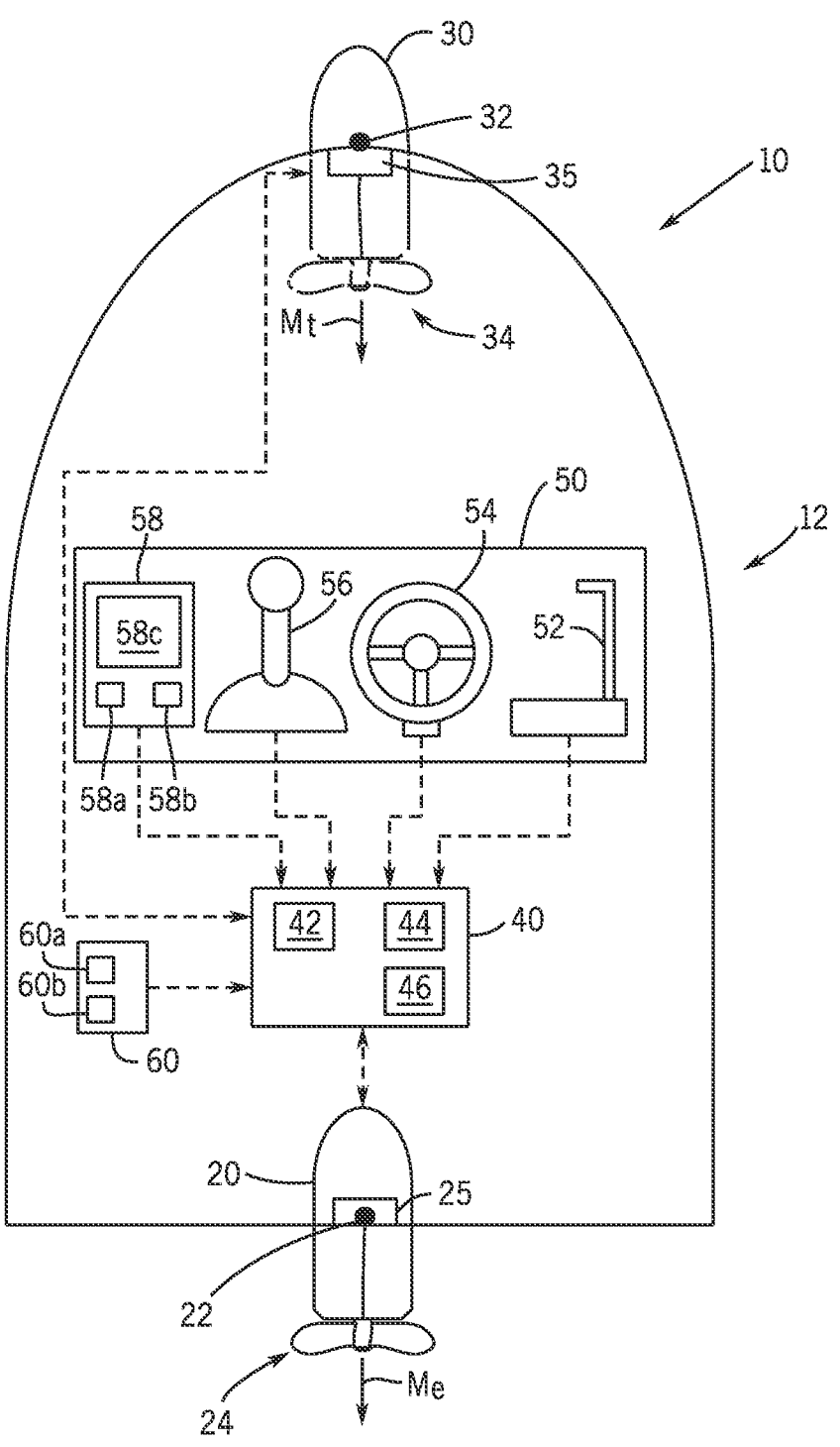
FIG. 1 illustrates a boat and a marine propulsion system according to the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Artificial intelligence (AI) is one field of computer engineering and information technology for studying a method of enabling a computer to perform thinking, learning, and self-development that can be performed by human intelligence and may denote that a computer imitates an intelligent action of a human.

Machine learning is one field of AI that enables a computer to perform learning without an explicit program. Machine learning may be technology that studies and establishes a system for performing learning based on experiential data, performing prediction, and autonomously enhancing performance and algorithms relevant thereto. Algorithms of machine learning may use a method that establishes a specific model for obtaining predictions or decisions on the basis of input data, rather than a method of executing program instructions that are strictly predefined.

A number of machine learning algorithms for classifying data have been developed. Decision tree, Bayesian network, support vector machine (SVM), and artificial neural network (ANN) are representative examples of the machine learning algorithms. A decision tree is an analysis method of performing classification and prediction by schematizing a decision rule into a tree structure. A Bayesian network is a model where a probabilistic relationship (conditional independence) between a plurality of variables is expressed as a graph structure. A Bayesian network is suitable for data mining based on unsupervised learning. A SVM is a model of supervised learning for pattern recognition and data analysis and is mainly used for classification and regression. An ANN is a model that implements the operation principle of biological neurons and a connection relationship between neurons and is an information processing system in which a plurality of neurons called nodes or processing elements are connected to one another in the form of a layer structure.

The ANN may denote all models where an artificial neuron (a node) of a network that is formed through a connection of synapses varies a connection strength of synapses through learning, thereby obtaining an ability to solve problems. The ANN may include a plurality of layers, and each of the plurality of layers may include a plurality of neurons. The ANN may also include a synapse connecting a neuron to another neuron. The ANN may be generally defined by the following factors: (1) a connection pattern between neurons of a different layer; (2) a learning process of updating a weight of a connection; and (3) an activation function for generating an output value from a weighted sum of inputs received from a previous layer. The ANN may include network models such as a fully connected network, a deep neural network (DNN), a recurrent neural network (RNN), a bidirectional recurrent deep neural network (BRDNN), a multilayer perceptron (MLP), and a convolutional neural network (CNN), but is not limited thereto.

The ANN may be categorized into single layer neural networks and multilayer neural networks, based on the number of layers. General single layer neural networks are configured with an input layer and an output layer. General multilayer neural networks are configured with an input layer, at least one hidden layer, and an output layer. The input layer receives external data and the number of neurons of the input layer is the same number of input variables. The hidden layer is located between the input layer and the output layer and receives a signal from the input layer to extract a characteristic from the received signal and transfers the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

Next, learning methods of an ANN will be described. The learning method of the ANN may be classified into supervised learning, unsupervised learning, semi-supervised learning, and reinforcement learning. Supervised learning is a method of machine learning for analogizing one function from training data. Unsupervised learning is a kind of machine learning in which a label may not be assigned to training data. Semi-supervised learning is a kind of machine learning that uses both training data with a label assigned thereto and training data with no label assigned thereto. In reinforcement learning, an environment is provided in which an agent is capable of determining an action to take at every moment, and the best action is obtained through experience.

Reinforcement learning may be performed by a Markov decision process (MDP). According to the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience, which is repeated until a future reward reaches a highest score.

The above principles and definitions having been laid out, the systems and methods of the present disclosure will now be described with respect to the figures.

FIG. 1 shows a boat 10. The boat 10 has a first marine drive 20 and a second marine drive 30 that produce thrust to propel the boat 10, as will be more fully described herein below. As illustrated, the first marine drive 20 is an outboard motor and the second marine drive 30 is a trolling motor. However, each could be any one of an inboard motor, stern drive, pod drive, outboard motor, trolling motor, jet drive, thruster, or any other marine propulsion device. Each marine drive 20, 30 is steerable about its respective first steering axis 22 or second steering axis 32 and produces thrust by causing rotation of its respective first propulsor 24 or second propulsor 34. Here, the first and second propulsors 24, 34 are propellers, but one or both propulsors 24, 34 could be impellers as in the case of jet drives. The propulsor 24 or 34 of a given marine drive 20 or 30 may be coupled in torque-transmitting relationship with an electric motor or with an internal combustion engine (more generally, a prime mover 25, 35), either of which is configured to rotate the propulsor 24 or 34 so as to produce a respective thrust $M_e$ or $M_t$.

The first marine drive 20 and the second marine drive 30 are rotatable about the first steering axis 22 and the second steering axis 32, respectively, which are generally perpendicular to a longitudinal axis and lateral axis of the boat 10 (i.e., that are generally vertical when the marine drives 20, 30 are not tilted or trimmed). Either or both of the marine drives 20, 30 may be configured to be operated in a forward gear, a neutral position, or a reverse gear. Both of the marine drives 20, 30 can be controlled to adjust the magnitude of their respective thrusts $M_e$ and $M_t$. For example, thrust may be adjusted by changing engine or motor speed, propeller pitch, and/or transmission slip in a manner that allows rapid and accurate control or maneuvering of the boat 10. As is known, engine speed can be varied by changing a position of a throttle valve of an engine, while electric motor speed can be varied by internally or externally regulating electrical power provided to the electric motor. The steering position, gear, and thrust magnitude of the first marine drive 20 can be varied independently of the steering position, gear, and thrust magnitude of the second marine drive 30, and vice versa.

The boat 10 also includes various control elements that make up a marine propulsion system 12. The marine propulsion system 12 comprises an operation console 50 in communication with a controller 40 (e.g., a helm control unit and/or a propulsion control unit, or any other control module) that contains a CAN bus 42 as described in U.S. Pat. No. 6,273,771, a processor 44, and a memory 46. As is conventional, the processor 44 can be communicatively connected to a computer readable medium that includes volatile or nonvolatile memory 46 upon which computer readable code is stored. The processor 44 can access and execute the computer readable code within the computer readable medium to carry out functions as described herein below.

In other embodiments, the CAN bus 42 may be external to the controller 40. In further embodiments, the operation console 50 and controller 40 may be connected via wireless communication rather than through physical wiring. It should be noted that the dashed lines shown in FIG. 1 are meant to show only that the various control elements are capable of communication with one another. The dashed lines do not represent actual wiring connecting the control elements, nor do they represent the only paths of communication between the elements.

The operation console 50 includes a number of input devices, such as a throttle/shift lever 52, a steering wheel 54, a joystick 56, and a keypad 58. The keypad 58 may include a mechanical input means (or mechanical keys 58a, 58b, for example, buttons or dome switches) and a touch-type input means. As one example, a touch-type input means may include a virtual key, a soft key, or a visual key, which is displayed on a touch screen display 58c through software processing, or may include a touch key disposed at a portion other than the touch screen display 58c. The display 58c displays various information to the operator, and as noted, may be a touch-sensitive display with soft keys. In other examples, the display 58c is not touch-sensitive. Additional keys may be provided anywhere on the operation console 50, such as on the joystick 56, steering wheel 54, and/or throttle/shift lever 52. A remote controller 60 may also be provided in wired or wireless communication with the controller 40. The remote controller 60 may be a remote controller (e.g., keypad or touch-sensitive display) dedicated to a particular one of the marine drives 20 or 30; a remote controller (e.g., keypad or touch-sensitive display) dedicated to the marine propulsion system 12 as a whole; or a user's smartphone or tablet executing a software application configured to allow the smart device to communicate with the marine propulsion system 12 via wireless communication. In another example, the input devices for controlling gear and thrust magnitude are located on a tiller handle used to steer the marine drive 20 or 30. In such an example, the controller 40 may be provided on or near the marine drive 20 or 30. Each of the above-noted input devices may provide a request for movement of the boat 10 to the controller 40, as is known.

Figure 2:
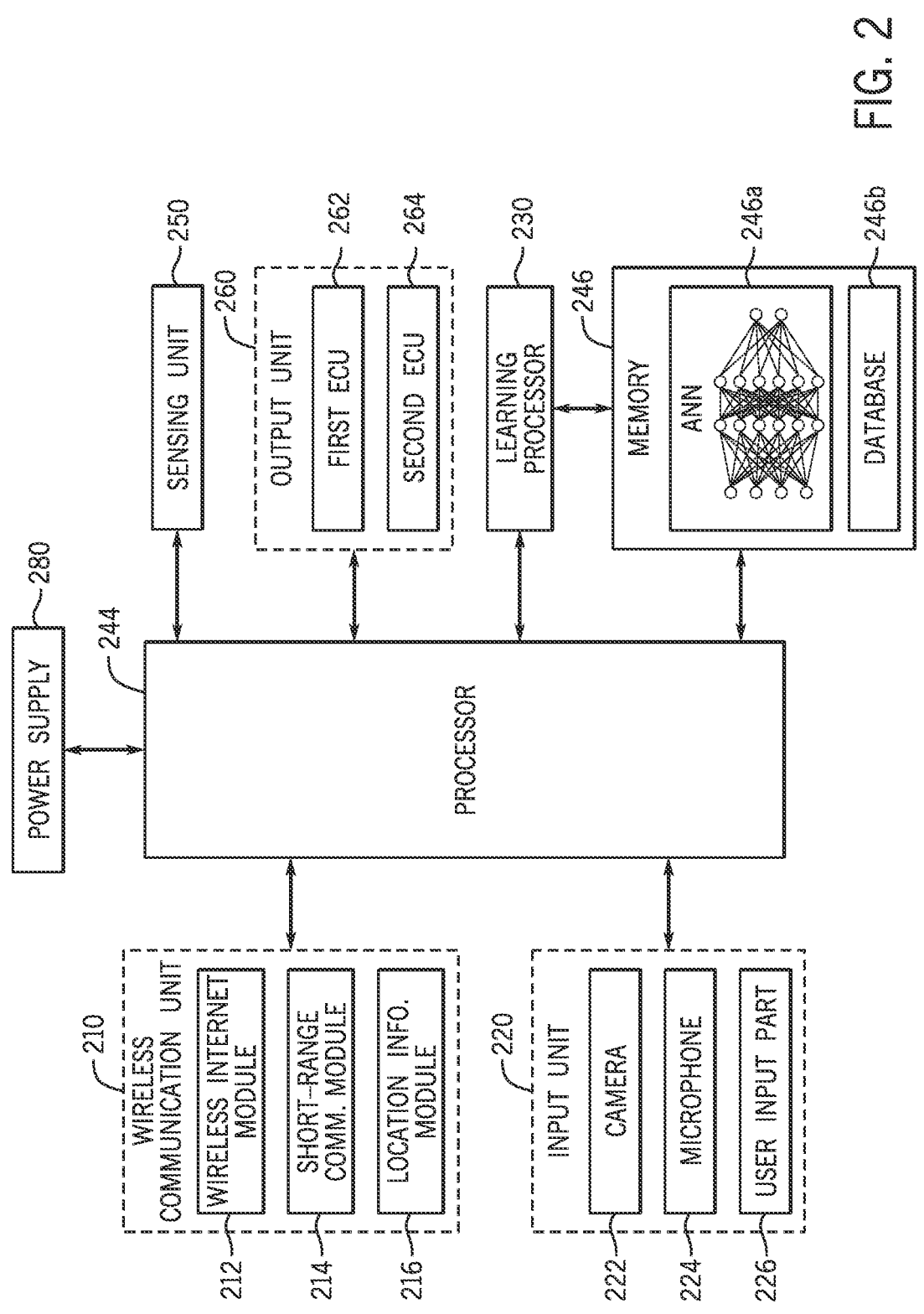
FIG. 2 illustrates an example of a control system according to the present disclosure.

FIG. 2 is a schematic showing one example of part of the marine propulsion system 12. The marine propulsion system 12 may include a wireless communication unit 210, an input unit 220, a learning processor 230, a sensing unit 250, an output unit 260, a memory 246, a processor 244, and a power supply unit 280, portions or all of which may be part of the controller 40 of FIG. 1 (e.g., the processors 44 and 244 may be one and the same; the memories 46 and 246 may be one and the same). In alternative embodiments, the processors and memories may be distributed across two or more devices (e.g., a central processor/memory and a processor/memory associated with a given marine drive or dedicated to the speed control algorithm described herein).

The wireless communication unit 210 may include at least one of a wireless internet module 212, a short-range communication module 214, and a location information module 216. The wireless internet module 212 refers to a module for wireless internet access and may be built in or external to the marine propulsion system 12. The wireless internet module 212 may be configured to transmit/receive a wireless signal in a communication network according to wireless internet technologies. The wireless internet technology may include Wireless LAN (WLAN), Wireless-Fidelity (Wi-Fi), or Wi-Fi Direct, and the wireless internet module 212 transmits/receives data according at least one wireless internet technology including internet technology not listed above. The short-range communication module 214 may support short-range communication by using at least one of Bluetooth™, Radio Frequency Identification (RFID), ZigBee, Near Field Communication (NFC), Wireless-Fidelity (Wi-Fi), Wi-Fi Direct, and Wireless Universal Serial Bus (USB) technologies. The location information module 216 is a module for obtaining the location (or the current location) of the boat 10, and its representative example includes a global positioning system (GPS) module. For example, the boat 10 may obtain its position by using a signal transmitted from a GPS satellite through the GPS module. In some examples, the GPS module is part of an attitude and heading reference system (AHRS) or an inertial measurement unit (IMU).

The input unit 220 may include a camera 222 for image signal input, a microphone 224 for receiving audio signal input, and a user input part 226 for receiving information from a user. The camera 222 processes image frames such as a still image or a video obtained by an image sensor in a video call mode or a capturing mode. The microphone 224 processes external sound signals as electrical voice data. The user input part 226 is to receive information from a user and in this example can be any of the throttle/shift lever 52, steering wheel 54, joystick 56, keypad 58, or remote controller 60 described hereinabove. These input devices may be wired to the processor 244 or may communicate wirelessly therewith via the short-range communication module 214.

The sensing unit 250 may include at least one sensor for sensing information related to the marine propulsion system 12. For example, the sensing unit 250 may include at least one of a compass, an acceleration sensor, a gyroscope sensor, an optical sensor (for example, the camera 222), a microphone (for example, the microphone 224), an environmental sensor (for example, a barometer or a thermometer), and a speed sensor (for example, a tachometer, a pitot tube, or a paddle wheel). These sensors may be wired to the processor 244 or may communicate wirelessly therewith via the short-range communication module 214.

The power supply unit 280 may receive external power or internal power under the control of the processor 244 and may then supply power to each component in the marine propulsion system 12. The power supply unit 280 includes a battery.

The learning processor 230 executes a machine learning algorithm by using the below-described various learning techniques. The learning processor 230 may be configured to receive, classify, store, and output information to be used for data mining, data analysis, and machine learning algorithms. The learning processor 230 may include one or more memory units that are configured to store data received, detected, sensed, generated, pre-defined, or outputted by another component or another device. As shown here, the learning processor 230 may be implemented with the memory 246. In another embodiment, the learning processor 230 may be implemented with a memory maintained in a cloud computing environment. The learning processor 230 generally stores data in one or more databases to identify, index, categorize, manipulate, store, retrieve, and output data for use in supervised, unsupervised, or reinforcement learning, data mining, and predictive analytics. The database 246b may be implemented using the memory 246 or a memory maintained under cloud computing environments. Information stored in the learning processor 230 may be used by the processor 244 or one or more other controllers (e.g., controller 40) of the marine propulsion system 12 by using at least one of various different types of data analysis algorithms or machine learning algorithms. Examples of such algorithms may include a k-nearest neighbor system, a purge logic, a neural network, Boltzmann machine, vector quantization, a support vector machine, hill climbing, a Bayesian network, sensor fusion, image fusion, pattern recognition, and automated planning. Further examples are provided herein below.

The processor 244 may determine or predict at least one executable operation based on information determined or generated by using a data analysis algorithm and/or a machine learning algorithm. To this end, the processor 244 may request, search for, receive, or use data of the learning processor 230 and may control the marine propulsion system 12 to execute a predicted operation or a preferably determined operation of the at least one executable operation. The processor 244 may be applied to various types of systems, including, but not limited to, an artificial neural network.

The processor 244 may include a sub-module enabling an arithmetic operation of processing a voice and a natural language voice, such as an input/output (I/O) processing module, an environment condition processing module, a speech-to-text (STT) processing module, a natural language processing module, a work flow processing module, and/or a service processing module.

The processor 244 may be configured to collect, sense, extract, detect, and/or receive a signal or data used for data analysis and a machine learning operation through one or more sensing components (e.g., sensing unit 250) of the marine propulsion system 12, so as to collect information to be processed and stored in the learning processor 230. Collecting of information may include an operation of sensing information through a sensor, an operation of extracting information stored in the memory 246, or an operation of receiving information through a communication means from another device. For example, the processor 244 may receive a wireless signal and wireless data through the wireless communication unit 210. The processor 244 may receive image information (or a corresponding signal), audio information (or a corresponding signal), data, or user input information through the input unit 220. The processor 244 may collect information in real time and may process or classify the collected information and may store the processed information in the memory 246 or the learning processor 230.

The memory 246 may store data for supporting various functions of the marine propulsion system 12. The memory

246 may store a plurality of application programs or applications executed in the marine propulsion system 12, pieces of data and instructions for an operation of the marine propulsion system 12, and pieces of data (for example, at least one piece of algorithm information for machine learning) for an operation of the learning processor 230. The memory 246 may store a model that is learned in the learning processor 230. The memory 246 may store the input data acquired by the input unit 220, the learning data (or the training data) used for the learning, and a learning history.

The processor 244 may control overall operations of the marine propulsion system 12 generally besides an operation relating to the application program. The processor 244 may provide appropriate information or functions to a user or process them by processing signals, data, and information inputted/outputted through the above components or executing application programs stored in the memory 246.

Additionally, in order to execute an application program stored in the memory 246, the processor 244 may control at least some of the components shown in FIG. 1.

The memory 246 may include an artificial neural network 246*a* and a database 246*b*. The artificial neural network 246*a* illustrated in FIG. 2 is merely an example of an artificial neural network including a plurality of hidden layers, and the artificial neural network of the present invention is not limited thereto. The artificial neural network 246*a* may be implemented as hardware, software, or a combination of hardware and software. When a portion or the whole of the artificial neural network 246*a* is implemented as software, one or more commands constituting the artificial neural network 246*a* may be stored in the memory 246.

The learning processor 230 may train (or learn) the artificial neural network 246*a*. The learning processor 230 may directly acquire input data acquired through the input unit 220 to train the artificial neural network 246*a* or may acquire input data stored in the database 246*b* to train/learn the artificial neural network 246*a*. Particularly, the learning processor 230 may determine optimized model parameters of the artificial neural network 246*a* by repeatedly learning the artificial neural network 246*a* by using the below-described various learning techniques.

The output unit 260 is used to generate an output and may include at least one of a dedicated electronic control unit (ECU) 262 of the first marine drive 20 and a dedicated electronic control unit (ECU) 264 of the second marine drive 30. When an operation of the marine propulsion system 12 is determined based on the data analysis algorithm and/or the machine learning algorithm, the processor 244 may control elements of the marine propulsion system 12 via the ECUs 262, 264 so as to execute the determined operation.

During research and development, the present inventors realized that current human-implemented methods for varying boat speed while fishing are inadequate because they rely on a human to manipulate a user input device (e.g., throttle lever, joystick, keypad, remote controller) in order to change the speed of the boat. Further, a human is not capable of remembering patterns of speed increases, decreases, and dwell times at those speeds, which are numerous and may vary based on current, weather, the body of water in which the boat is operating, fish species, water temperature, geographic location, and other factors that can be combined in various ways. The present inventors further realized that current "automatic" systems and methods for varying speed in a manner intended to catch fish are not only limited in terms of programming capabilities, but also rely on human input for selection of operating parameters such as minimum speed, maximum speed, step increase or step decrease, and dwell time at a particular speed. Such existing systems and methods do not increase or decrease speed at random, but rather follow user-selected patterns with user-defined steps. Further, the user is required to manually re-select those patterns if the user wants to run them again at a later time. The present inventors have therefore developed systems and methods for using machine learning in order to control boat speed in a manner predicted to increase an angler's fish catch rate.

Thus, the present disclosure is of a marine propulsion system 12 comprising a marine drive 20, 30 having a propulsor 24, 34 configured to provide thrust. A controller 40 is configured to vary a speed of the propulsor 24, 34. For example, the controller 40 may vary the speed of the propulsor 24, 34 by changing a throttle position of an internal combustion engine, changing the speed of an electric motor (e.g., by regulating electrical power provided to the electric motor), changing a gear ratio along a drive train between a prime mover and the propulsor's input shaft, changing transmission slip along the drivetrain, or any other known manner of changing the speed of the propulsor's input shaft. In one example in which electrical power to the electric motor is regulated, a controller external to a housing of the electric motor regulates power provided by an external power supply unit 280. In another example in which electrical power to the electric motor is regulated, a motor controller internal to the motor housing regulates power from the external power supply unit 280. In either example (external or internal regulation), regulating electrical power to the electric motor may include voltage pulse width modulation (PWM), pulse amplitude modulation (PAM), or any change in current or voltage used to drive the electric motor.

According to the present disclosure, the controller 40 is configured to periodically vary the speed of the propulsor 24, 34 according to a set of operating parameters. By periodically, it is not necessarily meant that the speed of the propulsor is varied at regular or repeating intervals, although that might be the case in some examples. Rather, "periodically" is meant to indicate that the controller 40 varies the speed of the propulsor 24, 34 from time to time, according to a set of operating parameters to be described herein. The controller 40 may vary the speed of the propulsor 24, 34 regularly, at predetermined constant intervals, if that is what the operating parameters dictate. Conversely, the controller 40 may vary the speed of the propulsor 24, 34 at random intervals if that is what the operating parameters dictate. Note that the controller 40 may vary the speed of one or both propulsors 24 and/or 34, and in the simplest implementation of the presently disclosed methods, varies the speed of only one propulsor 24 or 34 while the other propulsor is not producing thrust (e.g., is turned off). It is noted that the below methods therefore apply to control of the speed of propulsor 24 and/or 34, although the two propulsors will often be referred to together for the sake of brevity.

Prior to operation of the marine drives 20 and/or 30 such that the propulsors 24 and/or 34 operate at periodically varying speeds, the operator first selects a fish hunt mode from one of the user input devices described hereinabove (e.g., from the keypad 58 or remote controller 60) in order to enable the method described below.

In one example, the set of operating parameters comprises a speed increment or decrement value and a dwell time. For example, upon enablement of the fish hunt mode, the controller 40 is configured to begin operating the propulsor at a first predetermined speed, which may be a preprogrammed speed, a user-selected speed, the speed at which the propulsor was operating when the fish hunt mode was enabled, or a learned speed as described below. The dwell time is the predetermined time for which the controller 40 will maintain the propulsor at the first speed before varying the speed. The dwell time may be a preprogrammed time period, a user-selected time period, or a learned time period as described below. Once the initial (first) dwell time has elapsed, the controller 40 is configured to change the speed of the propulsor to a second speed. In one example, the controller 40 will decrease the speed of the propulsor. In another example, the controller 40 will increase the speed of the propulsor. Whether the controller 40 increases or decreases the propulsor speed depends on a preprogrammed command, whether the propulsor speed was previously increased or decreased, a user selection, or a learned operating parameter as will be described below. The speed increment or decrement value is the delta by which the controller 40 increases or decreases the speed of the propulsor, respectively. The speed increment or decrement value may be a preprogrammed delta, a user-selected delta, or a learned delta as described below. The increment or decrement can be carried out a single step (i.e., a square wave), as a square wave with multiple intermediate steps, or as a sine wave. The increment or decrement can be carried out slowly and smoothly, or rapidly and abruptly, initially according to a pre-programmed pattern, and thereafter adjusted via the machine learning algorithm discussed herein to increase a fish catch rate.

The controller 40 will then hold the propulsor speed at the initial speed plus the increment value or minus the decrement value (i.e., at the second speed) for a second dwell time. The second dwell time may be the same as the first dwell time or may be different from the first dwell time. For example, it may be beneficial for the second dwell time to be significantly less than the first dwell time, to mimic the movement of bait as it slows down or speeds up temporarily to evade a fish. After the second dwell time has elapsed, the controller 40 may increase or decrease the propulsor speed once again. The increment or decrement value during this round of control may the same as the increment or decrement value used during the previous round of control or may be a different increment or decrement value. For example, the controller 40 may return the propulsor speed to the initial (first) speed after the second dwell time has elapsed. In another example, the controller 40 may further increment or decrement the propulsor speed by the same increment or decrement value used during the prior round of control, so the speed is incremented or decremented by two times the initial increment or decrement value. The method continues as such, with the controller 40 incrementing or decrementing the propulsor speed, maintaining a given speed for a dwell time, then returning to the initial speed (or further incrementing or decrementing the propulsor speed) according to a predetermined program.

In some examples, the set of parameters may also include a maximum speed of the propulsor and a minimum speed of the propulsor. These operating parameters may be desired, for example, based on operator preference, a waterway speed limit or presence in a no-wake zone, the ideal operating conditions for a particular marine drive, weather, and/or a species of fish the operator desires to catch. The maximum and minimum speeds of the propulsor may be preprogrammed speeds, user-selected speeds, or learned speeds as described below.

The predetermined program (including operating parameters such as initial speed, speed increment or decrement, dwell time, maximum speed, and minimum speed) may be preprogrammed into the memory 46 of the controller 40 by the manufacturer or may be selected/programmed by the operator by way of a user input device. The predetermined program is run until the controller 40 receives feedback from a feedback device, discussed below, after which the controller 40 may save a set of parameters that successfully resulted in a fish catch and/or may enter a learning mode.

As noted, the marine propulsion system 12 also includes one or more feedback devices configured to provide an input to the controller 40. The one or more feedback devices comprise at least one of the following: an input key 58a, 58b, 60a, 60b configured to be manipulated by an operator; a speed sensor (e.g., as part of sensing unit 250) configured to determine the speed of the propulsor 24, 34 or a speed of a boat 10 on which the marine drive 20, 30 is installed; an optical instrument (e.g., camera 222); and a microphone 224.

The key configured to be manipulated by the operator may be a key on the keypad 58, the throttle/shift lever 52, the joystick 56, the remote controller 60, or the tiller handle (not shown). The key can be a mechanical or a soft key, as described hereinabove with respect to the input means. For example, the key may allow the operator to input a command to the controller 40 to increase or decrease speed of the propulsor in one of the manners noted hereinabove. Such an input from the operator is interpreted by the controller 40 as the operator's desire to manually take over operation of the marine drive if the marine drive was previously operating in an automatically controlled mode. The operator's desire to take over control of the marine drive manually may indicate that the operator has caught a fish and would like the boat to slow down or stop so that the operator can reel the fish in. In another example, the key is a waypoint drop key 60a on the remote controller 60, which allows the operator to save the current GPS position of the boat 10 in the memory 46 as a later-retrievable waypoint. Often, an angler will want to return to the same waypoint at a later time to see if it is still a good location for catching fish. By dropping a waypoint, the operator is able to look up the latitude and longitude of the waypoint via a user interface and to navigate to that waypoint. Some systems are able to control the propulsor(s) 24 and/or 34 to automatically navigate the boat to the waypoint upon input of an appropriate command. In another example, the key is a "catch" key 60b on the remoter controller 60 or one of the various input devices located at the operation console 50. The operator may select the "catch" key 60b when a fish is caught, which selection is thereafter communicated to the controller 40. The catch key may be a dedicated key on the relevant input device or may be a key that is configurable as a catch key in a particular mode of operation of the marine propulsion system 12, such as a fish hunt mode.

In some examples, the feedback device is a speed sensor. The speed sensor may be configured to determine the speed of the propulsor. For example, the speed sensor can be a magnetic or optical tachometer on the propulsor's input shaft. Alternatively, the speed sensor can be placed on the prime mover's output shaft, with a gear ratio taken into account, as applicable. The speed sensor may alternatively be configured to determine the speed of the boat 10 on which the marine drive is installed. For instance, the speed sensor can be a pitot tube or a paddle wheel sensor. Alternatively, the speed sensor can be a GPS module, with speed being determined based on distance traveled versus time. A change in speed of the propulsor 24, 34 and/or boat 10 may indicate that the operator has input a command to change the propulsor speed in response to catching a fish. Depending on the size of the boat 10, the sensitivity of the speed sensor, the prime mover being used to provide thrust, and the initial boat speed, the speed sensor may also be able to detect a change in boat speed in response to a fish being hooked on the line, which may result in increased drag and therefore a slower boat speed.

In some examples, the feedback device is a direction sensor, such as a compass, accelerometer, or gyroscope. The direction sensor is able to determine if the boat 10 has suddenly changed direction or started circling, either of which may indicate a fish has been caught.

In some examples, the feedback device is an optical sensor. For example, the optical sensor may be part of the camera 222 described hereinabove. The optical sensor may capture a still or moving image of the operator as the operator catches a fish. The controller 40 is configured to process the still or moving image and to derive postural features based on differences/disparity in pixel location between images simultaneously captured by the optical sensor. The postural features may include whether the operator is standing up straight or bent over, whether the operator is leaning forward or backward, whether the operator has turned/pivoted, whether the operator's hands/arms are stationary or moving, etc. For example, the controller 40 may be configured to interpret a change in the operator's movement from standing up straight to leaning slightly backwards as an indication that a fish has been caught, as the operator reels in the fish. The controller 40 may be configured to interpret a change in the operator's hand/arm from stationary to making a repetitive circular motion as an indication that the operator is reeling in a fish.

In some examples, the feedback device is a microphone, for example the microphone 224 described hereinabove. The microphone 224 feeds audio signals to the controller 40, which is configured to interpret the audio signals to determine whether they indicate a fish has been caught. For example, the controller 40 has a voice recognition module configured to recognize phrases such as, for example, "got one," "hooked one," "reel . . . in," or other phrases an angler might use to indicate a fish has been caught. In other examples, the manufacturer or operator can program a specific phrase to be recognized as one indicating a fish has been caught. In still other examples, the controller 40 is configured to interpret louder or more excited speech patterns captured by the microphone 224 as an indication that a fish has been caught.

In some examples, the controller 40 is configured to recognize a fish catch when one or more of the above types of feedback is received from a feedback device. In other examples, the controller 40 is configured to recognize a fish catch after two or more of the above types of feedback are received from two or more respective sensors. For instance, the operator's posture may not be determinatively indicative of a fish catch, so the controller 40 may be configured to require that the speed sensor also senses a change in speed of the propulsor or the boat, or that the operator has selected a speed change key, before the controller 40 will determine that a fish has been caught, or vice versa. The controller 40 may be configured such that the two or more types of feedback must be received within a predetermined period of time before determining that a fish has been caught.

According to the present disclosure, the controller 40 is configured to update the set of operating parameters (e.g., the dwell time, the increment or decrement value, the maximum or minimum speed) in response to receiving the input(s) from the feedback device(s). For example, while carrying out the preprogrammed patterns of speed increments/decrements and dwell times, if the controller 40 determines that operating at X speed for A time period, followed by operating at Y speed for B time period results in a fish catch, the controller 40 may save the final portion of the pattern that resulted in a fish catch in the memory 46 for use during a next iteration of control. The controller 40 may be configured to try this successful pattern at regular intervals, randomly, or on command the next time the fish hunt mode is enabled. In this way, the set of operating parameters that had previously been used to control the speed of the propulsor is updated to include a set of operating parameters (e.g., operating at Y speed for B time period) that was successful in the past. The operator may be able to save this updated set of parameters in association with certain other information, such as geographical location, time of day, temperature, and/or fish species, for later retrieval when fishing in the same conditions. For example, the operator may choose to save a certain set of updated operating parameters in the memory 46 under the name of a specific lake, and the next time the operator fishes on that lake, to select the lake name from a list of options on a display screen. Should the operator later be fishing on a different lake, feedback from the feedback devices may indicate that a different set of operating parameters results in a fish catch, which different set of operating parameters may be used to update the initial set of operating parameters, and which set of updated operating parameters may be saved in the memory 46 under the different lake name for later retrieval. The same idea could be used to save sets of operating parameters for different fish species or for different times of year.

The controller 40 may be configured to update the operating parameters based on the operating parameters immediately preceding a catch, as discussed in the example above. Alternatively, the controller 40 may be configured to update the operating parameters based on a pattern of operating parameters that was used for a predetermined time period before a fish was caught. For example, if the boat 10 moved at X speed for A time period, Y speed for B time period, and X speed for A time period again before a fish was caught, and all of those operating parameters occurred within two minutes before a fish was caught, the controller 40 may store that entire pattern in the memory 46 for later regular, random, or on-command retrieval the next time the fish hunt mode is enabled.

If the controller 40 uses the updated set of operating parameters regularly the next time the fish hunt mode is enabled, this may mean the controller 40 carries out the initially programmed pattern of speed increases/decreases and dwell times, but, for example, carries out the successful pattern once every five minutes or once every four speed changes. If the controller 40 uses the updated set of operating parameters randomly the next time the fish hunt mode is enabled, the controller 40 can do so pseudo-randomly (e.g., switching between using the successful pattern once every five minutes to once every seven minutes to once every four speed changes, etc. per a program) or truly randomly, with the time or number of speed changes being dictated by a random number generator. If the controller 40 uses the updated set of operating parameters on command the next time the fish hunt mode is enabled, this may be done in response to operator input via the input means (e.g., the keypad 58 or remote controller 60).

In another example, the controller 40 is configured to process the input from the feedback device(s) using a machine learning algorithm so as to update the set of operating parameters. In contrast to the above-noted methods of updating the operating parameters, which rely on repeating known patterns that have resulted in fish catches in the past, and which may also rely on an operator saving such patterns in the memory 46 in conjunction with a given body of water, species, etc., the machine learning algorithm is able to update the set of operating parameters on the fly as conditions (i.e., the environment) change. In one example, the machine learning algorithm is a reinforcement learning algorithm.

Figure 3:
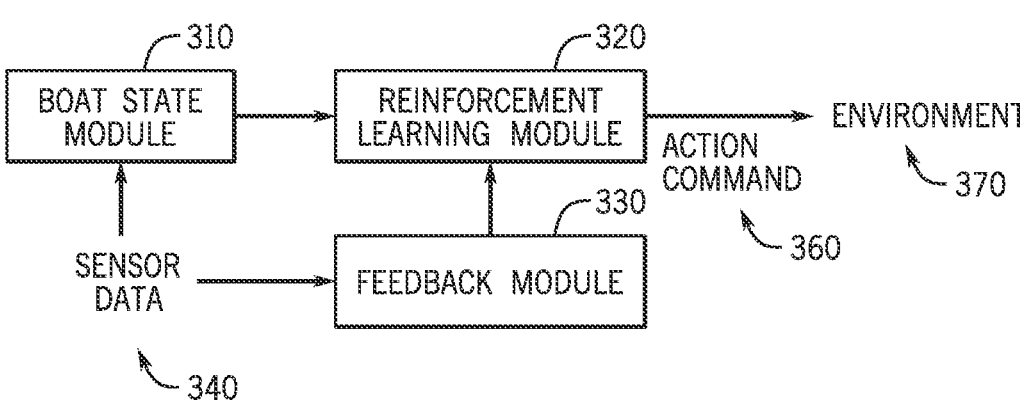
FIG. 3 is a schematic of a reinforcement learning algorithm.

FIG. 3 shows a schematic of the reinforcement learning (RL) algorithm executed by the controller 40 for purposes of updating the set of operating parameters. The RL algorithm includes a boat state module 310, a reinforcement learning module 320, and a feedback module 330.

Data from the various sensors described hereinabove is provided to the boat state module 310 in order to represent the state of the boat 10 at a given point in time. Such data includes the speed of the propulsor 24, 34 and the speed of the boat 10, determined as described hereinabove. Such data may also include a temperature of water in which the marine drive 20, 30 is operating; a depth of water in which the marine drive 20, 30 is operating; a reading from a sonar installed on the marine drive 20, 30 or the boat 10; a geographical position of the boat 10; and a current heading of the boat 10. The temperature of the water can be determined by a thermometer. The depth of the water can be determined by the sonar. The geographical position of the boat 10 can be determined by the location information module 216 (e.g., GPS device). The current heading of the boat 10 can be determined by a compass. In some examples, the GPS device and compass are combined into an inertial measurement unit (IMU) or an attitude and heading reference system (AHRS). Other state/sensor data may include the time of day, the local chart position, the current sonar return, and/or the steering angle of the marine drive 20, 30. Collectively, this sensor data is labeled 340 in FIG. 3.

Some or all of the sensor data 340 may also be provided to the feedback module 330. The feedback module 330 is provided with inputs related to fish catches from the feedback devices described hereinabove, some of which include sensors. The feedback module 330, however, also receives input from the one or more user input keys (e.g., waypoint drop key 60a, "catch" key 60b, decrease speed key 58a, increase speed key 58b), the optical instrument (e.g., camera 222), and the microphone 224.

The RL module 320 is a network, which may be implemented as hardware, software, or a combination of the two. In one example, the RL module 320 is an artificial neural network, such as a fully connected network. In other examples the RL module 320 is a support-vector network or a Bayesian network. The learning processor 230, the artificial neural network 246a, and the database 246b may constitute part or all of the RL module 320.

The RL module 320 receives the boat state data from the boat state module 310 and the feedback data from the feedback module 330. The feedback represents the positive reward, neutral reward, or negative reward that the RL module 320 uses to update the set of operating parameters. For example, a positive reward may be that feedback related to a fish catch (as described hereinabove) was received. A neutral reward may be that no feedback related to a fish catch was received within a given period of time (e.g., ten minutes). A negative reward may be that no feedback related to a fish catch was received after the given period of time has expired. An additional negative reward may be a user input to a key indicating that the operator would have expected a fish bite by that time, given prior experience, but has not yet been successful at catching a fish (essentially telling the RL module 320 that it needs to explore a different set of operating parameters). Such a forced-exploration key could be provided on the remote controller 60 or at the operation console 50.

Based on the current state of the boat 10 from the boat state module 310 and the feedback from the feedback module 330, the RL module 320 outputs an action command 360 for progressing to a next state. For example, the RL module 320 outputs an updated set of operating parameters to the propulsor 24, 34 as an updated set of commands for the propulsor 24, 34 to increase speed or decrease speed by a given magnitude, next to dwell at the increased or decreased speed for a given period of time, next to increase speed or decrease speed by a given magnitude after the dwell time has elapsed, and so on. The updated set of operating parameters may be a pattern of speed increases and/or decreases and dwell times or may include random speed increases and/or decreases, held for random dwell times. The operating parameters may be updated only as to the increment or decrement, only as to the dwell time, or as to both the increment/decrement and the dwell time. The maximum and minimum allowable speeds can also be updated. The extent to which the set of operating parameters is changed and how far into the future the marine drive 20, 30 is controlled depends on the learning. The action command is executed by the marine drive 20, 30 in the environment 370. For instance, the action command is provided to the ECU 262, 264 of the marine drive 20, 30, which ECU 262, 264 controls actuators in the marine drive 20, 30 to carry out the action command.

As may be appreciated, reinforcement learning is a form of machine learning and may be considered a type of Artificial Intelligence (AI). An objective of the RL module 320 is to predict state values following a policy decision and to change the policy towards achieving an optimal policy (i.e., the policy that will yield more returns—here, fish catches—than any other policy). For example, for the fish hunt mode, the policy decision may be to slow down, with the optimal policy (at least under certain conditions) being to slow down for a given dwell time and then speed up thereafter to achieve the next state. The next state may be measured by, among other things, boat speed. The reward data would relate to the success of catching a fish while in the next state based on the optimal policy.

The RL module 320 follows a policy (a strategy followed to pick an action) in order to output the updated set of operating parameters. Some example policies are to always randomly pick the next set of operating parameters or to always pick the next state that gives the highest known reward. In one example, the RL module's policy is a balance of exploitation (i.e., to use what was known to work in the past) and exploration (i.e., to explore new states). In one example, the RL module 320 uses Boltzmann exploration to balance exploitation with exploration. In other examples, the RL module 320 may use epsilon-greedy exploration, Thompson sampling, or a forward dynamics prediction model. In other examples, the RL module 320 may use memory-based exploration, with the episodic memory being populated by historical states of the boat 10 or, in some examples, with historical states of other boats as retrieved from a wireless network via the wireless internet module 212. For example, data related to historical states of other boats in the same geographical area, perhaps at the same time of day and/or year, perhaps in similar temperatures, etc. can be aggregated and stored in a cloud computing environment for use by the RL module 320 when populating the episodic memory. Using such historical data aggregated over time can help the RL module 320 achieve an optimal policy faster than if such historical data is not used.

In one example, the RL module 320 determines that a given number of catches (rewards) in a given time period signifies that a favorable policy is being followed and will exploit the policy until the learning algorithm determines that exploration will lead to a better policy. For example, if the data from the feedback module 330 indicates that the operator has selected the "catch" key 60*b* three times in the prior twenty minutes, the RL module 320 may be configured to exploit the sets of parameters that were outputted as the action command during that prior twenty-minute window.

In one example, the RL module 320 is configured to weight certain types of feedback more heavily than others. For example, the RL module 320 may weight data relating to an operator selecting the "catch" key 60*b* or the waypoint drop key 60*a* more heavily than data relating to the operator selecting a decrease speed key or a direction change key, as the latter two types of inputs may be something the operator does even when they have not hooked a fish. Similarly, the RL module 320 may be configured to weight data from the microphone 224 more heavily than data from the camera 222, as an operator using a phrase such as "I got one" may be a more reliable indicator of a fish catch than the operator's posture. The RL module 320 may also be configured to learn over time what types of feedback data are more reliable indicators of a fish actually having been caught than others. For example, an operator may be able to flag false catches to the controller 40, such that the RL module 320 is able to learn what types of data it should weight less or ignore in the future.

The RL module 320 may use model-based or model-free reinforcement learning. In particular examples, the RL module 320 uses Q learning or Deep Q learning. Because it is difficult to create a model of a body of water, all the aquatic lifeforms in the body of water, and the angler's setup due to constantly changing variables (such as time of year, temperature, whether the body of water is often fished, the bait being used, and the angler's skill), such off-policy, model-free algorithms may be particularly appropriate for the RL module 320. In other examples, model-free algorithms such as State-action-reward-state-action (SARSA) or proximal policy optimization (PPO) may be used.

In some examples, one of the action commands that the RL module 320 is configured to output is a command to the display 58*c* to display an image that shows where fish have been caught on a map of the surrounding area. Thus, the RL module 320 may include a convolutional neural network (CNN) for purposes of processing such visual imagery. The output image may be a heat map showing in one color where many fish have been caught, in another color where a moderate number of fish have been caught, and in another color where very few fish have been caught. The data used to create the heat map may be from a single fishing trip, from multiple fishing trips by the same angler, or from fishing trips aggregated across many anglers/trips and retrieved from a database via the wireless Internet module 212.

In some examples, one of the action commands that the RL module 320 outputs is a commanded heading for the boat 10. The action command is provided to a steering control module of the propulsor 24, 34, which steering control module is configured to determine an amount by which and direction in which the propulsor 24, 34 should turn to achieve the commanded heading. This may be the case, for example, when the RL module 320 determines that more fish were being caught in a historical geographical position than in the current position and thus the boat 10 should return to that historical position to attempt to exploit known rewards. The RL module 320 may also command a different heading if the feedback has been a series of negative rewards (e.g., no bite for longer than a given period of time, operator selects the "explore" key) and the RL module 320 determines that it may be beneficial for the angler to explore new geographical positions. The option for the RL module 320 to output a heading command may be a user-selectable feature that can be turned on or off at the operator's desire.

In other examples, the controller 40 is configured to use machine learning programs other than RL. For example, the controller 40 can use supervised learning, with input to the "catch" key 60*b* being the trigger for a catch event used to train a model. One example of an unsupervised approach would be to mine for traits associated with longer fishing trips, which may correlate to more fish being caught.

By using machine learning, such as RL, the marine propulsion system 12 is able to more efficiently and effectively increase fish catches than a human recalling successful patterns of speed control on their own or even saving those speed control patterns in a memory for later retrieval and execution. Machine learning allows the controller 40 not only to exploit known successful patterns, but also to explore new sets of operating parameters that may lead to even more fish being caught than known patterns. Machine learning also allows the controller 40 to adapt nearly immediately to changing conditions, such as, by way of non-limiting example, if the boat has moved to a location where a new species of fish is located, if the boat has moved into a different depth and/or different temperature of water, or if the angler has starting using a new type of bait. Machine learning further allows the controller 40 to aggregate data across many fishing trips, potentially from many anglers, in order to learn the optimal policy. Similar to the "manual" method of updating operating parameters, the controller 40 may also be configured to allow the operator to save a learned policy in connection with a specific condition (e.g., fishing in a particular lake). However, machine learning allows that policy to adapt on the fly should conditions on that lake be different the next time the angler fishes there.

Figure 4:
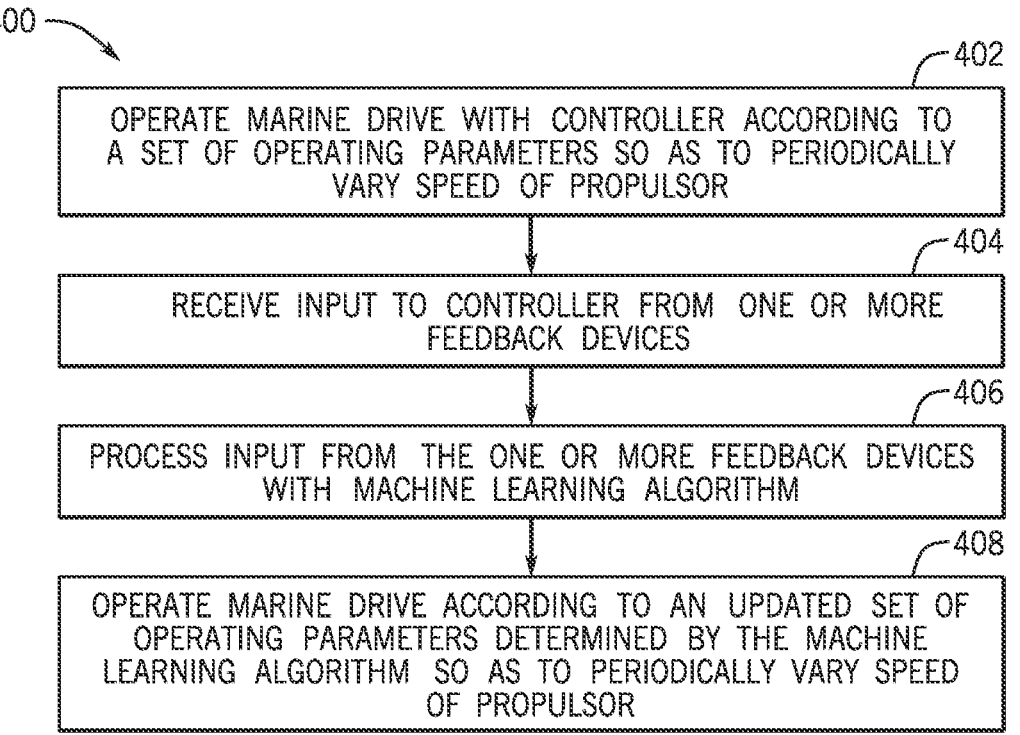
FIG. 4 shows one example of a method according to the present disclosure.

As shown in FIG. 4, a method 400 of varying a speed of a propulsor 24, 34 on a marine drive 20, 30 is contemplated herein. The method 400 comprises operating the marine drive 20, 30 with a controller 40 according to a set of operating parameters so as to periodically vary a speed of the propulsor 24, 34, as shown at 402. The method 400 comprises receiving an input to the controller 40 from one or more feedback devices, described hereinabove, as shown at 404. The method 400 comprises processing the input from the one or more feedback devices with a machine learning algorithm, as shown at 406. The method 400 comprises operating the marine drive 20, 30 according to an updated set of operating parameters determined by the machine learning algorithm so as to periodically vary the speed of the propulsor 24, 34, as shown at 408.

In some examples, the set of operating parameters comprises at least one of the following: a maximum speed of a prime mover in torque-transmitting relationship with the propulsor; a minimum speed of the prime mover; an increment or decrement value by which the speed of the prime mover is to be varied; and a length of time for which the prime mover is to be operated at a given speed (i.e., a dwell time).

In some examples, the one or more feedback devices comprises at least one of the following: a key 58*a*, 58*b*, 60*a*, 60*b* configured to be manipulated by an operator; a speed sensor configured to determine the speed of the propulsor 24, 34 or a speed of a boat 10 on which the marine drive 20, 30 is installed; an optical instrument (e.g., camera 222); and a microphone 224.

Figure 5:
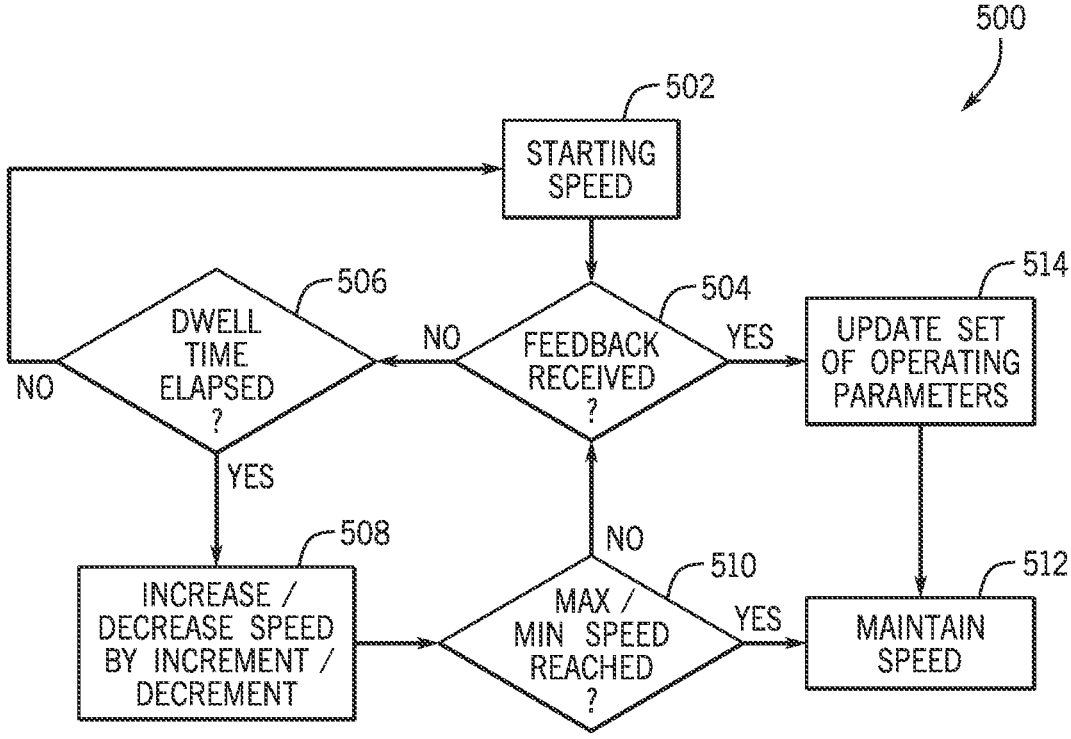
FIG. 5 shows another example of a method according to the present disclosure.

FIG. 5 shows one example of a more detailed method 500 of varying a speed of a propulsor 24, 34 on a marine drive 20, 30. Box 502 represents the propulsor 24, 34 operating at a starting speed for the given iteration of control. At 504, it is determined whether feedback is received, such as from one of the various feedback devices described hereinabove. If NO, it is then determined at 506 whether a given dwell time has elapsed. The dwell time is the time for which the propulsor 24, 34 is configured to operate at the starting speed before switching to the subsequent speed as dictated by the current set of operating parameters. If NO at 506, the propulsor 24, 34 continues to operate at the starting speed (box 502) until feedback is received at 504 or until the dwell time elapses at 506. If YES at 506, the speed of the propulsor 24, 34 is increased or decreased by the increment or decrement, respectively, as dictated by the current set of operating parameters.

At 510, it is determined whether a maximum or minimum propulsor speed is reached, as dictated by the current set of operating parameters. If YES, the method continues to box 512 and the speed of the propulsor 24, 34 is maintained at the maximum or minimum. The operator can then choose whether to run the fish hunt mode again or whether to control speed manually. In other examples, once the minimum or maximum speed is reached, the controller 40 is configured to reverse the speed change steps (i.e., to decrement speed if the maximum speed was reached or to increase speed if the minimum speed was reached). In another example, the controller 40 is configured to randomly increase and/or decrease speed once the maximum or minimum speed is reached. In still another example, the controller 40 is configured to return to box 502, but with the proviso that if the maximum speed was reached, step 508 must be to decrement speed, or conversely if the minimum speed was reached, step 508 must be to increment speed.

If NO at 510, then it is once again determined whether feedback is received at 504. If NO, the method continues to 506, and cycles through 508 and 510, or through 502 once again. In this way, as discussed hereinabove, the speed of the propulsor 24, 34 is incremented and decremented, only incremented, or only decremented, in a pattern or randomly, as dictated by the current set of programmed or learned operating parameters.

If YES at 504, either when proceeding from box 502 or decision 510, the method 500 continues to box 514, where the set of operating parameters is updated. The set of operating parameters may be updated, for example, by the controller 40 automatically saving the final portion of the pattern that resulted in a fish catch in the memory 46 for use during a next iteration of control, or by any of the other non-AI implementations discussed hereinabove. Alternatively, the controller 40 may update the set of operating parameters using one of the machine learning algorithms discussed hereinabove, such as, for example, reinforcement learning. The method proceeds to 512, where the speed is maintained. Maintaining the current speed may be beneficial because if feedback has been received, such feedback likely indicates a fish catch, and the operator may therefore no longer want the propulsor's speed to increment and decrement automatically while the operator is reeling in the fish. Further, if the feedback that was received was an operator's command to manually take over control of the marine drive 20, 30 being controlled by the presently contemplated algorithm, such as a command to increase or decrease speed, the operator may wish to maintain speed at the speed the operator manually selected. Should the operator wish to further manually control propulsor speed, the operator can do so with further inputs, after which the fish hunt algorithm will be canceled until it is next enabled. Alternatively after 514, the method 500 may include continuing to operate in the fish hunt mode by returning to box 502 until the operator manually cancels the fish hunt mode.

In one particular example of a system envisioned herein, a marine propulsion system 12 comprises an electric marine drive 20, 30 having an electric motor 25, 35 in torque-transmitting relationship with a propulsor 24, 34. In one example, the electric marine drive 20, 30 is a trolling motor. A controller 40 is configured to vary a speed of the electric motor 25, 35. A feedback device (e.g., as part of an input unit 220 or a sensing unit 250) is configured to provide an input to the controller 40. The controller 40 is configured to vary the speed of the electric motor 25, 35 according to a set of operating parameters so as to periodically vary a speed of the propulsor 24, 34. The controller 40 is configured to update the set of operating parameters in response to receiving the input from the feedback device. A marine device with an electric motor as the prime mover may be particularly suited to application of the algorithms of the present disclosure due to the small increments by which speed can be controlled.

In some examples, the set of operating parameters comprises a maximum speed of the electric motor 25, 35 and a minimum speed of the electric motor 25, 35. In a particular non-limiting example, the set of operating parameters comprises a maximum electrical power provided to the electric motor 25, 35 and a minimum electrical power provided to the electric motor 25, 35.

In some examples, the set of operating parameters comprises an increment or decrement value by which the speed of the electric motor 25, 35 is to be varied. In a particular non-limiting example, the set of operating parameters comprises an increment or decrement value by which the electrical power provided to the electric motor 25, 35 is to be varied.

In some examples, the set of operating parameters comprises a length of time for which the speed of the electric motor 25, 35 is to be operated at a given speed (i.e., a dwell time). In a particular non-limiting example, the set of operating parameters comprises a length of time for which a given electrical power is to be provided to the electric motor 25, 35 (i.e., a dwell time).

In some examples, the controller 40 is configured to process the input from the feedback device using a machine learning algorithm so as to update the set of operating parameters.

In some examples, the controller 40 is configured to process at least one of the following additional inputs using the machine learning algorithm so as to update the set of operating parameters: the speed of the propulsor 24, 34; a temperature of water in which the marine drive 20, 30 is operating; a depth of water in which the marine drive 20, 30 is operating; a reading from a sonar coupled to a boat 10 on which the marine drive 20, 30 is installed; a geographical position of the boat 10; a current speed of the boat 10; a current heading of the boat 10; a historic speed of the boat 10 when the input from the feedback device was previously received; and a historic heading of the boat 10 when the input from the feedback device was previously received.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

The invention claimed is:

1. A marine propulsion system comprising:
an electric marine drive having an electric motor in torque-transmitting relationship with a propulsor;
a controller configured to:
vary a speed of the electric motor;
train a machine learning model to predict that a fish bite has occurred for a passenger that is fishing on a boat that is propelled by the electric marine drive, based on historical sensory data captured by a feedback device of the boat;
determine, using the machine learning model, that the fish bite has occurred based on current sensory data captured by the feedback device;
identify a set of operating parameters of the boat at a time approximate to the fish bite; and
populate a data store with the set of operating parameters.

2. The marine propulsion system of claim 1, wherein the controller is configured to associate at least one of the following environmental parameters with the set of operating parameters in the data store:
a speed of the propulsor;
a temperature of water in which the electric marine drive is operating;
a depth of water in which the electric marine drive is operating;
a reading from a sonar coupled to the boat;
a geographical position of the boat;
a current speed of the boat;
a current heading of the boat;
a historic speed of the boat when an input from the feedback device was previously received; and
a historic heading of the boat when the input from the feedback device was previously received.

3. The marine propulsion system of claim 2, wherein the controller is configured to:
identify a current set of environmental parameters of the boat;
select a current set of operating parameters from the data store based on the current set of environmental parameters; and
vary the speed of the electric motor based on the current set of operating parameters.

4. The marine propulsion system of claim 1, wherein the machine learning model is trained by using a reinforcement learning algorithm.

5. The marine propulsion system of claim 1, wherein the set of operating parameters comprises a maximum speed of the electric motor and a minimum speed of the electric motor.

6. The marine propulsion system of claim 1, wherein the set of operating parameters comprises an increment or decrement value by which the speed of the electric motor is to be varied.

7. The marine propulsion system of claim 1, wherein the set of operating parameters comprises a length of time for which the electric motor is to be operated at a given speed.

8. The marine propulsion system of claim 1, wherein the feedback device is a key configured to be manipulated by an operator.

9. The marine propulsion system of claim 1, wherein the feedback device is a speed sensor configured to determine a speed of the propulsor or a speed of the boat.

10. The marine propulsion system of claim 1, wherein the feedback device is an optical instrument or a microphone.

11. The marine propulsion system of claim 1, wherein the controller is configured to:
select a current set of operating parameters from the data store randomly; and
vary the speed of the electric motor based on the current set of operating parameters.

12. A method of varying a speed of a propulsor on a marine drive, the method comprising:
training a machine learning model to predict that a fish bite has occurred for a passenger that is fishing on a boat that is propelled by the marine drive, based on historical sensory data captured by one or more feedback devices of the boat;
determining, using the machine learning model, that the fish bite has occurred based on current sensory data captured by the one or more feedback devices;
identifying a set of operating parameters of the boat at a time approximate to the fish bite;
populating a data store with the set of operating parameters;
selecting a current set of operating parameters from the data store randomly; and
operating the marine drive with a controller according to the current set of operating parameters so as to periodically vary a speed of the propulsor.

13. The method of claim 12, wherein the set of operating parameters comprises at least one of the following:
a maximum speed of a prime mover in torque-transmitting relationship with the propulsor;
a minimum speed of the prime mover;
an increment or decrement value by which the speed of the prime mover is to be varied so as to vary the speed of the propulsor; and
a length of time for which the prime mover is to be operated at a given speed.

14. The method of claim 12, wherein the one or more feedback devices comprises at least one of the following:
a key configured to be manipulated by an operator;
a speed sensor configured to determine the speed of the propulsor or a speed of the boat;
an optical instrument; and
a microphone.

15. A marine propulsion system comprising:
a marine drive having a propulsor configured to provide thrust;
a controller configured to:
vary a speed of the propulsor;
train a machine learning model to predict that a fish bite has occurred for a passenger that is fishing on a boat that is propelled by the marine drive, based on historical sensory data captured by one or more feedback devices of the boat;

determine, using the machine learning model, that the fish bite has occurred based on current sensory data captured by the one or more feedback devices;

identify a set of operating parameters of the boat at a time approximate to the fish bite; and populate a data store with the set of operating parameters; and the one or more feedback devices, which are configured to provide an input to the controller.

16. The marine propulsion system of claim 15, wherein the controller is configured to associate at least one of the following environmental parameters with the set of operating parameters in the data store:

the speed of the propulsor;

a temperature of water in which the marine drive is operating;

a depth of water in which the marine drive is operating;

a reading from a sonar coupled to the boat;

a geographical position of the boat;

a current speed of the boat;

a current heading of the boat;

a historic speed of the boat when the input from the one or more feedback devices was previously received; and a historic heading of the boat when the input from the one or more feedback devices was previously received.

17. The marine propulsion system of claim 16, wherein the controller is configured to:

identify a current set of environmental parameters of the boat;

select a current set of operating parameters from the data store based on the current set of environmental parameters; and vary the speed of the propulsor based on the current set of operating parameters.

18. The marine propulsion system of claim 15, wherein the machine learning model is trained by using a reinforcement learning algorithm.

19. The marine propulsion system of claim 15, wherein the set of operating parameters further comprises at least one of the following:

a maximum speed of the propulsor; and a minimum speed of the propulsor.

20. The marine propulsion system of claim 15, wherein the one or more feedback devices comprises at least one of the following:

a key configured to be manipulated by an operator;

a speed sensor configured to determine the speed of the propulsor or a speed of the boat;

an optical instrument; and a microphone.

* * * * *